| (12) | United States Patent | (10) Patent No.: | US 9,127,647 B2 |
|---|---|---|---|
| | Poulsen | (45) Date of Patent: | Sep. 8, 2015 |

(54) WIND TURBINE NACELLE, TRANSPORT SYSTEM FOR A WIND TURBINE NACELLE AND METHOD FOR TRANSPORTING A WIND TURBINE NACELLE

(75) Inventor: Henning Poulsen, Skjern (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 475 days.

(21) Appl. No.: 13/151,582

(22) Filed: Jun. 2, 2011

(65) Prior Publication Data

US 2011/0304122 A1    Dec. 15, 2011

(30) Foreign Application Priority Data

Jun. 11, 2010  (EP) .................................. 10165733

(51) Int. Cl.

| F03D 11/04 | (2006.01) |
| B60P 3/40 | (2006.01) |
| B23P 11/00 | (2006.01) |
| B62D 53/00 | (2006.01) |
| F03D 11/00 | (2006.01) |
| F03D 1/00 | (2006.01) |

(52) U.S. Cl.
CPC . *F03D 11/00* (2013.01); *B60P 3/40* (2013.01); *F03D 1/005* (2013.01); *Y02E 10/722* (2013.01); *Y02E 10/726* (2013.01); *Y10T 29/49826* (2015.01)

(58) Field of Classification Search
CPC .................................. B60P 3/40; F03D 1/005
USPC ........ 280/404; 414/800; 416/244; 248/163.1, 248/157, 121, 544
See application file for complete search history.

(56) References Cited

U.S. PATENT DOCUMENTS

2008/0258473 A1 * 10/2008 McMaster ....................... 290/55

FOREIGN PATENT DOCUMENTS

| CN | 1636112 A | 7/2005 |
| CN | 1771151 A | 5/2006 |
| CN | 101479470 A | 7/2009 |
| CN | 201334057 Y | 10/2009 |
| CN | 101678787 A | 3/2010 |
| EP | 1 336 755 A1 | 8/2003 |
| EP | 1 622 792 B1 | 2/2006 |
| JP | 3809855 B2 | 8/2006 |

(Continued)

OTHER PUBLICATIONS

"Energy Insight—Alpha Ventus Offshore Wind Farm Turbine Installed"; Energy Insight; pp. 1; XP55066609; 2009; Sep. 30, 2009.

(Continued)

*Primary Examiner* — Joseph Rocca
*Assistant Examiner* — Jacob Knutson

(57) ABSTRACT

A wind turbine nacelle is provided. The wind turbine nacelle includes a longitudinal extension and a bottom part. The longitudinal extension has a rear end and a front end. At the bottom part, an opening is located which serves as an interface to a tower of a wind turbine at a designated assembly situation of the nacelle. A first detachable leg arrangement is attached to at least one of the front end and the rear end. A second detachable leg arrangement is attached at the bottom part. Further embodiments are directed to a transport system for a wind turbine nacelle and to a method for transporting a wind turbine nacelle.

9 Claims, 6 Drawing Sheets

(56) References Cited

FOREIGN PATENT DOCUMENTS

| WO | WO 2004/101313 A1 | 11/2004 |
| WO | WO 2008000268 A1 * | 1/2008 |
| WO | WO 2010/066255 A1 | 6/2010 |

OTHER PUBLICATIONS

"REpower 5M 5"; alpha ventus; pp. 1-13; XP007922483; 2009; Sep. 7, 2009.

* cited by examiner

WIND TURBINE NACELLE, TRANSPORT SYSTEM FOR A WIND TURBINE NACELLE AND METHOD FOR TRANSPORTING A WIND TURBINE NACELLE

CROSS REFERENCE TO RELATED APPLICATIONS

This application claims priority of European Patent Office application No. 10165733.6 EP filed Jun. 11, 2010, which is incorporated by reference herein in its entirety.

FIELD OF INVENTION

The present invention concerns a wind turbine nacelle with a longitudinal extension with a rear end and a front end and with a bottom part at which there is located an opening serving at a designated assembly situation of the nacelle to be an interface to a tower of a wind turbine. It also concerns a transport system for a wind turbine nacelle and a method of transporting such wind turbine nacelle.

BACKGROUND OF INVENTION

The transport of large wind turbine components such as nacelles or tower segments by lorry or other earth-bound vehicles is usually quite complicated. Due to the large load, in particular the weight of such wind turbine components, it is usually necessary to use cranes in order to load or unload large wind turbine components onto or down from such vehicles. Such loading or unloading by crane makes the procedure very complicated and also expensive.

In addition, it is necessary to ensure that the height of the means of transport combined with the height of the transported load does not exceed certain height limits which are due to bridges and/or tunnels that are to be passed on the way. This is a particular challenge when trying to transport wind turbine nacelles. Most particularly direct drive nacelles comprising a direct drive generator are very large in diameter (about up to 6 meters) so that keeping the transport height smaller than the given limits is currently sometimes impossible and some other routes or even other means of transport have to be chosen instead. Reduction of combined height is thus a very important task.

Yet another problem is caused when the wind turbine component is taken off the earth-bound transport vehicle e.g. onto a ship: This normally implies that two different fixing system to fix the wind turbine component to the respective means of transport need to be used.

It is known from EP 1622792 B1 to suspend a wind turbine component in between a trailer and a dolly using standardisation means at either end of the wind turbine component. These standardisation means are then connected to the trailer and to the dolly. This system may in fact be realised in such way that the above-mentioned obstacles are circumvented. However, by transporting a wind turbine component in this way, the component becomes a part of the vehicle itself as it connects the trailer and the dolly. Therefore, forces inflicted onto the transport vehicle during transport may damage the wind turbine component.

SUMMARY OF INVENTION

This is a problem for wind turbine nacelles in particular. They usually have a smaller length but a bigger height than a tower segment and they are made of a less stable material than tower segments. In addition, they have a more irregular structure than tower segments because they comprise an opening in the bottom part which forms an interface with the tower. Therefore, the same forces might not seriously affect a tower segment while they might be quite dangerous to a nacelle.

It is therefore the object of the invention to provide the possibility for a wind turbine nacelle to be transported and/or to be supplied for transport in a way that best suits both the circumstances of transport, in particular the height limits, and at the same time makes such transport safer for the wind turbine nacelle itself.

This object is met by the features of the independent claims.

Therefore, a wind turbine nacelle of the above-mentioned kind is enhanced by attaching a first detachable leg arrangement to the front end and/or the rear end and by attaching a second detachable leg arrangement at the bottom part. Thereby, the second detachable leg arrangement is preferably partially inserted into the opening.

The first detachable leg arrangement and the second detachable leg arrangement may be different in shape and even material and may also comprise different kinds of legs. A leg arrangement may comprise only one leg for instance but may also comprise two or more legs as well, depending on the transport necessities. In general, it can be considered to be any kind of arrangement upon which the wind turbine nacelle can be positioned such that it rests stably on the ground in the region of the leg arrangement. This means, that a leg arrangement can also be any kind of solid foot having a much wider extension in one or more directions than would be usually known in the context of legs. It may thus also generally be called a positioning means.

Such positioning of leg arrangements, on the one hand at either the front and or the rear end (or in fact either ends) and on the other hand via the bottom part, makes sure that the nacelle is positioned on the ground in a highly stable way which ensures that it can be transported by only inflicting forces onto the leg arrangements instead of onto parts of the nacelle itself. Furthermore, the attachment of the leg arrangements to the nacelle and in fact the attachment of fixing means to fix the leg arrangements to a means of transport may be realised at two different levels of height above ground. At a first height level, the first leg arrangement is affixed to the nacelle, at a second height level the second leg arrangement is affixed to the nacelle. Accordingly, the first leg arrangement can also be connected to a means of transport at a first connection level and the second leg arrangement can be connected to the same means of transport at a second connection level. This also implies that—as will be shown below—transport and the preparation for transport of such wind turbine nacelle is by far easier than used to be the case. As for the use of the opening at the bottom part for attachment of the second leg arrangement, this gives an extra advantage in the sense that the second leg arrangement can be firmly positioned at the bottom part without any particular extra effort, in particular with no fixing means attached to the outside shell of the nacelle in the region of the bottom part. This particular arrangement of construction also implies that the nacelle can be positioned at a minimum distance from the ground despite the fact that the second leg arrangement is positioned at the bottom part of it. A stable connection between a leg arrangement and the bottom part of the nacelle would usually imply a certain added height of overall. By including part of the leg attachment inside of the nacelle through the bottom part opening this height can be considerably reduced.

To sum up, a wind turbine nacelle according to the invention has the advantage of high stability, little extra height due to the leg arrangements and optionally the possibility to suspend it at different suspension levels at the same time.

According to the invention a transport system for a wind turbine nacelle, in particular a wind turbine nacelle according to the invention as described before, comprises a first trailer and a second trailer interconnected by a bridge assembly, the bridge assembly being realized such that in an assembled state it indirectly holds the nacelle by being fixed to a first leg arrangement and to a second leg arrangement while at the same time forming a stable frame which can be suspended in between the first trailer and the second trailer.

Such transport system includes the leg arrangements attached to the wind turbine nacelle, which are usually used for positioning the nacelle above ground. To this end, a bridge assembly is used which holds both the first leg arrangement and the second leg arrangement fixedly. This bridge assembly also forms a stable frame. The expression "stable" is used for such frames which bear the forces inflicted upon them during transport from the side of the first trailer and/or from the second trailer. This means that these forces will not be led further into the leg arrangements and eventually to the wind turbine nacelle itself, or at least they will be considerably reduced so that there is no danger of injuries to the nacelle. This makes sure that the wind turbine nacelle is not put under unnecessary stress. In other words, the bridge assembly is both a holding means for the two leg arrangements and a stabiliser and buffer with respect to forces which occur during transport.

As for the definition of "trailer", it should be noted that this expression may include both trailers suspended on a supporting vehicle such as a tractor and so-called dollies. A trailer may also comprise a traction means of its own or—as preferred—be pulled by means of a tractor, which eliminates a lot of weight for the incorporation of a traction means and its power supply. According to a preferred embodiment, one of the trailers is a dolly and the other one either a trailer interconnected with a tractor or a tractor itself. It may also be noted, that the bridge assembly and either of the first and second trailers may have parts which can be assigned to both of them. For instance, the bridge assembly would not typically be considered to have wheels on its underside, but it may have in the context of the invention. In this sense, the bridge assembly may take over the functions of a dolly which might make a second trailer realised as a dolly unnecessary. In the context of the invention such a construction would be considered such that the bridge arrangement and the second trailer are not separated in terms of parts—as is however preferably the case in order to simplify separation and handling—but only in terms of functions.

According to the invention, a method of transporting a wind turbine nacelle of the aforementioned kind comprises the following steps:
a) attaching a first detachable leg arrangement to the front end and/or the rear end,
b) attaching a second detachable leg arrangement at the bottom part,
c) fixing a bridge assembly to the first leg arrangement and to the second leg arrangement in such way that the bridge assembly forms a stable frame which can be suspended in between a first trailer and a second trailer of a transport system,
d) connecting the bridge assembly to the first and second trailer,
e) optionally raising the bridge assembly.

In the first two steps the wind turbine nacelle is prepared for transport in such way that it becomes a wind turbine nacelle according to the invention. In the following steps this nacelle is then fixed to the transport system according to the invention in a way that makes possible a safe transport. In order to reach such state it may also be necessary to raise the bridge assembly so that the wind turbine nacelle is also raised. In particular this means that the first and second leg arrangements will be raised above ground so that they do not stand on the ground during transport. With respect to transport heights it may be noted however, that it is not necessary to lift the wind turbine nacelle and the bridge assembly very far above ground. In particularly critical circumstances during transport, it is even possible to lower the bridge assembly with the wind turbine nacelle to an absolute minimum level in order to be able to pass a passage which otherwise would not be possible. In fact, as described above, the height of the transport system can be realized only slightly bigger than the height of the wind turbine nacelle on its own positioned on the two leg arrangements. As has also been described above, the extra height due to the two leg arrangements can be very little as well because the second leg arrangement can be positioned in the opening of the bottom part. The first leg arrangement can also be realized in such way that it adds as little extra height as the second leg arrangement.

Particularly advantageous embodiments and features of the invention are given by the dependent claims, as revealed in the following description. Thereby, features revealed in the context of the nacelle and/or the nacelle may also be realized in the context of the respective other and in the context of the transport method.

As for the wind turbine nacelle according to the invention of there are two particularly advantageous embodiments:

Firstly it is particularly preferred that the first leg arrangement comprises a frame part projecting essentially in longitudinal direction from the rear end or front end at which the first leg arrangement is located, the frame part being positioned above ground when the wind turbine nacelle is placed on the ground via at least the first leg arrangement, the frame part being realized such that it is stable enough for a raising force from below sufficient to raise the wind turbine nacelle at the rear end or front end at which the first leg arrangement is located.

Such a frame part projects from the leg arrangement in the direction which is essentially perpendicular to the vertical direction which defines that direction in which the nacelle is positioned on the ground. Thus it may be considered to be a kind of extra part only attached to the first leg arrangement. This frame part can be used as that part of the first leg arrangement at which fixing means of the bridge assembly will be attached. Instead of positioning the bridge assembly underneath the leg arrangement—which would be quite a normal use of a leg arrangement—it can now be fixed at a different point, i.e. the frame part, instead.

According to a second preferred embodiment, the second leg arrangement comprises a fixing region elevated from the ground when the wind turbine nacelle is placed on the ground via at least the second leg arrangement. In this context it is particularly preferred that the fixing region comprises legs which project in a horizontal direction. At these legs parts of the bridge assembly can be affixed from the side of the nacelle, i.e. perpendicular to its longitudinal extension. Such attachment along with the longitudinal extension of the nacelle is particularly easy to realize, again in comparison with an attachment of the bridge assembly at the bottom part of the second leg arrangement. Furthermore, it is not necessary to lift the second leg arrangement prior to connecting it with the bridge assembly, which again makes handling much easier and procedures quicker and in fact cheaper.

Turning now to the transport system itself, preferred embodiments refer particularly to the bridge assembly.

Preferably, the bridge assembly comprises a first longitudinal beam and a second longitudinal beam arranged essentially in parallel in an assembled state of the bridge assembly such that in between the first longitudinal beam and the second longitudinal beam the first and/or the second leg arrangement is fixed. The first longitudinal beam and the second longitudinal beam are preferably at least as long as the longitudinal extension of the nacelle to be transported. This means that they can be arranged along the complete extension of the nacelle. In this sense, a longitudinal beam comprising several beam parts interconnected with each other would also be considered to be one single longitudinal beam. Whereas the longitudinal beams may fix both the first and second leg arrangement in between them, it is more preferred that they only fix one leg arrangement by direct contact. This implies that the other leg arrangement which is not fixed directly by the longitudinal beams will be fixed by a different kind of measure, while it is preferred that the longitudinal beams and such other kind of measure are interconnected in some way. This way the other leg arrangement is indirectly connected to the longitudinal beams. Such embodiment provides some extra safety guarantee for the overall fixing of the nacelle system (comprising the nacelle itself and the leg arrangements).

In particular it is preferred that the second leg arrangement is fixed by the longitudinal beams. For instance, in combination with a fixing region as described above projecting sideways from the longitudinal extension of the nacelle, such fixing of the second leg arrangement to the longitudinal beans may be realised by using the fixing regions and by putting them into orifices of the longitudinal beams.

This implies, which is a particularly preferred embodiment of the transport system according to the invention, that the first and/or second leg arrangement is fixed in between the first longitudinal beam and the second longitudinal beam by a form fitting, which is an easy way of connecting those two elements without additional tools and extra force for fixing.

Such fixing may be realised for example if the first longitudinal beam and/or the second longitudinal beam is a beam which comprises at least at one position in a cross section an upper end section and a lower end section and a middle section in between, which upper end section and/or lower end section has a larger horizontal extension perpendicular to the longitudinal extension of the beam than the middle section so that the first and/or second leg arrangement is held in the region of the middle section in between the upper end section and the lower end section. For instance, the longitudinal beams may have a cross section shape resembling an H or a IT turned round by 90°. Along the middle section there is thus formed an orifice into which parts of the respective leg arrangement can be inserted.

Another option, which can be combined with the previous and also be used on its own, is that the first longitudinal beam and/or the second longitudinal beam is a beam with a middle section with at least one opening into which the first and/or second leg arrangement fits at least one of its ends. This particular end of the leg arrangement, for instance the fixing region mentioned before, can then be inserted into the opening of the first and/or second longitudinal beam. Again, this is an easy way of connecting the leg arrangement with the beam.

In addition, the bridge assembly preferably comprises a cross beam orientated essentially perpendicularly to the longitudinal extension of the bridge assembly. Such cross beam can interconnect the aforementioned longitudinal beams and either be permanently affixed to them, temporarily affixed or even just laid upon them. Such crossbeam makes sure that the frame structure of the bridge assembly is held in the cross direction as well. According to a particularly preferred embodiment the cross beam is, in an assembled state of the bridge assembly, positioned such that the first and/or second leg arrangement is positioned on the cross beam via a frame part which is part of the first and/or second leg arrangement. Such frame part may for instance be the frame part mentioned before in the context of the particularly preferred embodiment of the wind turbine nacelle. In other words, the crossbeam and the frame part mentioned before form another connection based on the form fitting principle which is reliable in this particular context.

A particularly advantageous solution in this context is to position the cross beam such that the first leg arrangement is positioned on it. The first leg arrangement then rests upon the cross beam which means that the full weight of about half the nacelle rests upon this cross beam. In return the cross beam will be connected to the rest of the bridge assembly by means of the force resulting from this weight. However, it is still preferred to interconnect the cross beam with the rest of the bridge assembly by fixing means such as bolts.

In a preferred embodiment of the transport system the bridge assembly comprises several separate construction parts (such as the longitudinal beams and the cross beam) which are detachably interconnected in an assembled state. This way the construction parts can be assembled around the nacelle and dense to leg arrangements. This means that the nacelle with its leg arrangements does not need to be lifted onto the bridge arrangement, but rather the bridge arrangement is built around it. This results in a reduction of effort and costs.

As has been mentioned before, it is often necessary to raise the nacelle and/or the bridge assembly before heading off for transport. For that purpose the transport system preferably comprises a raising means capable of raising the bridge assembly from a loading position into a transport position and back.

In order to make sure the transport system according to the invention can be used for numerous systems of wind turbine nacelles of today and of future generations and in consideration of the fact that the bridge assembly may be constructed around such wind turbine nacelle, the inventors have found it to be particularly advantageous that the transport system comprises adaption means for adapting the extensions of the bridge assembly to the size of the nacelle to be transported. For instance such adaption means may include prolongations of longitudinal beam is and/or cross beams or the possibility to add extra length to these beams by any other means. This is way different wind turbine nacelles of different sizes can still be transported with the same transport system, also in the future.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numbers refer to like objects throughout. Objects in the diagrams are not necessarily drawn to scale.

DETAILED DESCRIPTION OF INVENTION

Figure 1:
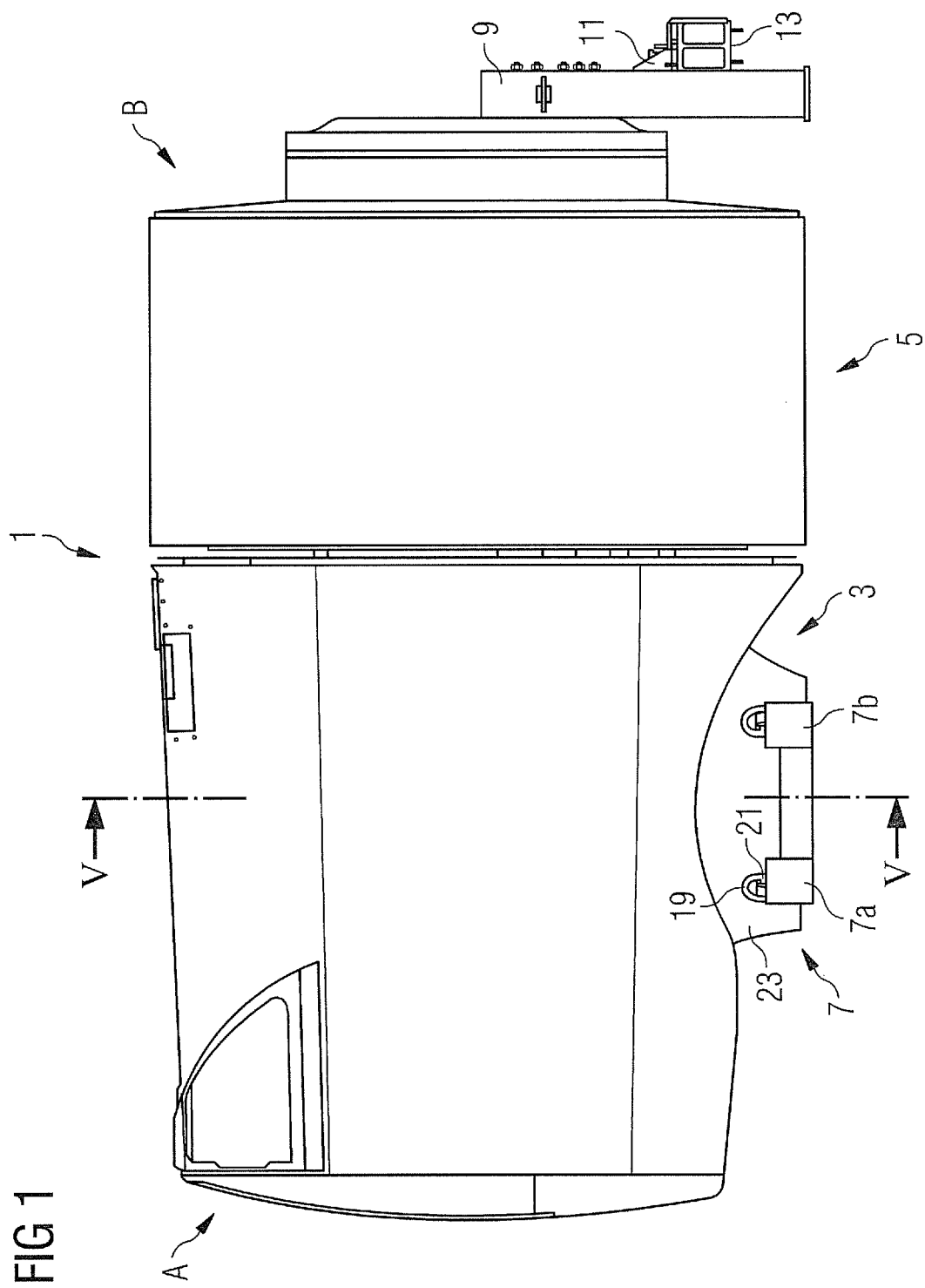
FIG. 1 shows a side view of a nacelle according to an embodiment of the invention.

FIGS. 1 to 5 show a wind turbine nacelle 1. Referring in particular to FIG. 1, the nacelle 1 has a longitudinal extension with a front end B and a rear end A. The nacelle 1 has a bottom part 5 in which there is an opening 3. A first leg arrangement 9 is attached at the front end B of the nacelle 1 and a second leg arrangement 7 is attached at the bottom part 5. More specifically, the second leg arrangement 7 is inserted into the opening 3.

The leg arrangement 9 is bolted to the front end B of the nacelle 1, i.e. in a region in which the hub of the rotor (not shown) of the wind turbine will be fixed later. The leg arrangement 9 (cf. FIG. 2) comprises two legs which end in a semi circular carrier structure 10. In the region of the carrier structure 10 the leg arrangement 9 is bolted temporarily to the front end B of the nacelle 1. The leg arrangement 9 has a main vertical extension. However, at the side facing away from the front end B off the nacelle 1 there is attached a frame part 11 which projects away from the front end B and which forms a kind of additional foot above ground level underneath which a crossbeam 13 is positioned, which can be used to raise the nacelle 1 at its front end B.

The second leg arrangement 7 comprises two cross beams 7a, 7b with fixing rings 19. Onto the crossbeams 7a, 7b a tubular structure 23 is fixed. Flanges 21 attached to the tubular structure 23 lead through the fixing rings 19 in order to provide for a fixing of the tubular structure 23 to the crossbeams 7a, 7b.

Some of the details shown in FIG. 1 can be clearer understood when going along FIGS. 2 to 5.

Figure 2:
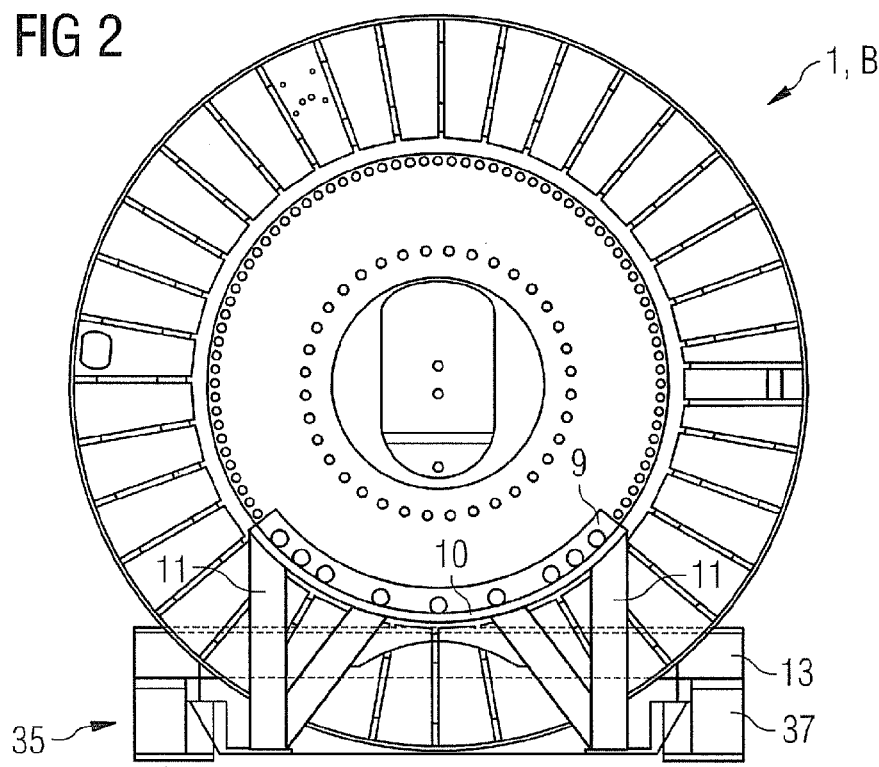
FIG. 2 shows the view of the same nacelle as in FIG. 1 seen from the front end of the nacelle.

For instance, in FIG. 2, which shows a look at the front end B of the nacelle 1, there are also depicted two longitudinal beams 35, 37 underneath the cross beam 13 which serve to carry the cross beam 13 in the context of a bridge assembly which will be explained later (cf. FIG. 7).

Figure 3:
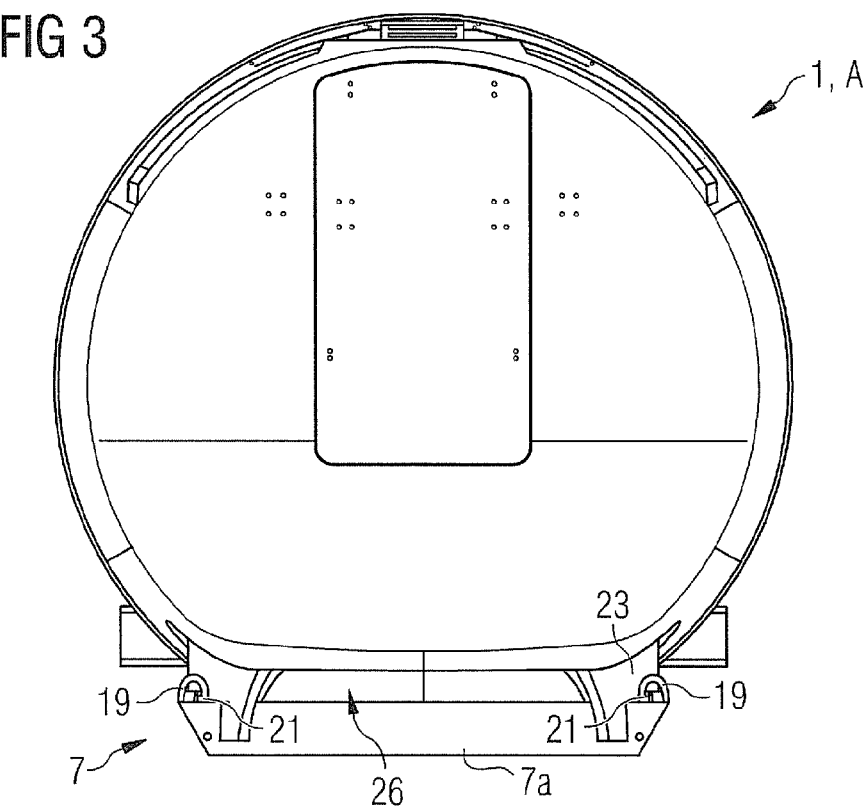
FIG. 3 shows the view of the same nacelle as in the previous figures from the rear end of the nacelle.
Figure 4:
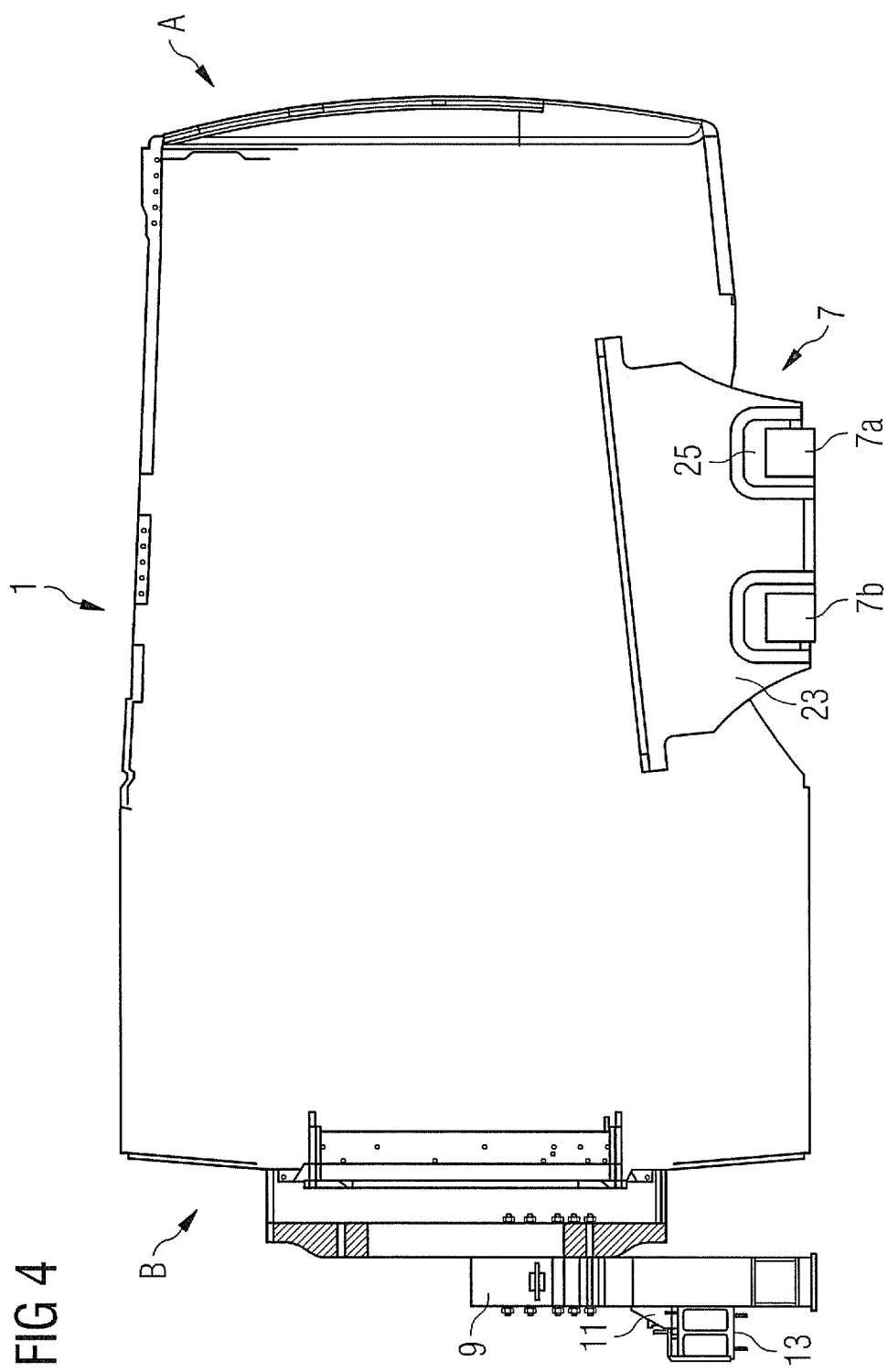
FIG. 4 shows a section view of the same nacelle as in the previous figures along a vertical section in the longitudinal direction of the nacelle.
Figure 5:
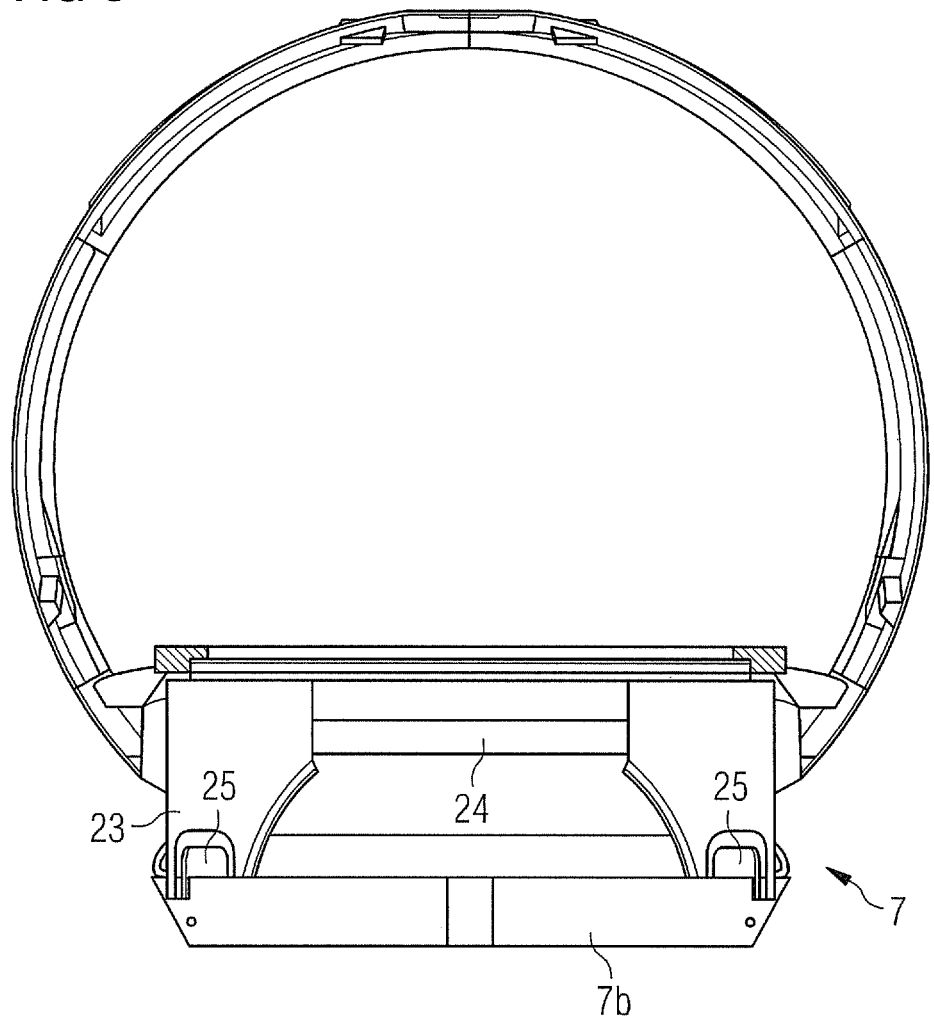
FIG. 5 shows a section view of the same nacelle as in the previous figures along a line V-V depicted in FIG. 1.

In FIGS. 3 and 5 the shape of the tubular structure 23 is easier to perceive. From the perspective of the view at the rear end of the nacelle 1 (cf. FIG. 3) it can be seen that the tubular structure 23 is basically made up like the tower of a wind turbine, however with cut-outs 26 both at the end facing into the direction of the rear end A of the nacelle 1 and at the other end facing into the direction of the front end B of the nacelle 1. As can be seen in FIG. 4, the cut-outs 26 divide the tubular structure 23 into two halves interconnected by a connecting beam 24. Both in FIG. 3 and FIG. 4 it can be seen that the cross beams 7a, 7b do not end with a vertical end structure, but rather with a diagonal one. These end structures constitute a fixing region which is partially elevated from the ground, the reason of which will be explained with reference to FIG. 8.

FIG. 4 shows the nacelle 1 in a longitudinal section view. As can be seen here in particular, the leg arrangement 7 is orientated such that the tubular structure 23 is inserted into the opening 3 in a similar way as the end of a wind turbine tower. Orifices 25 in the tubular structure 23 serve as openings into which the crossbeams 7a, 7b are inserted.

Figure 6:
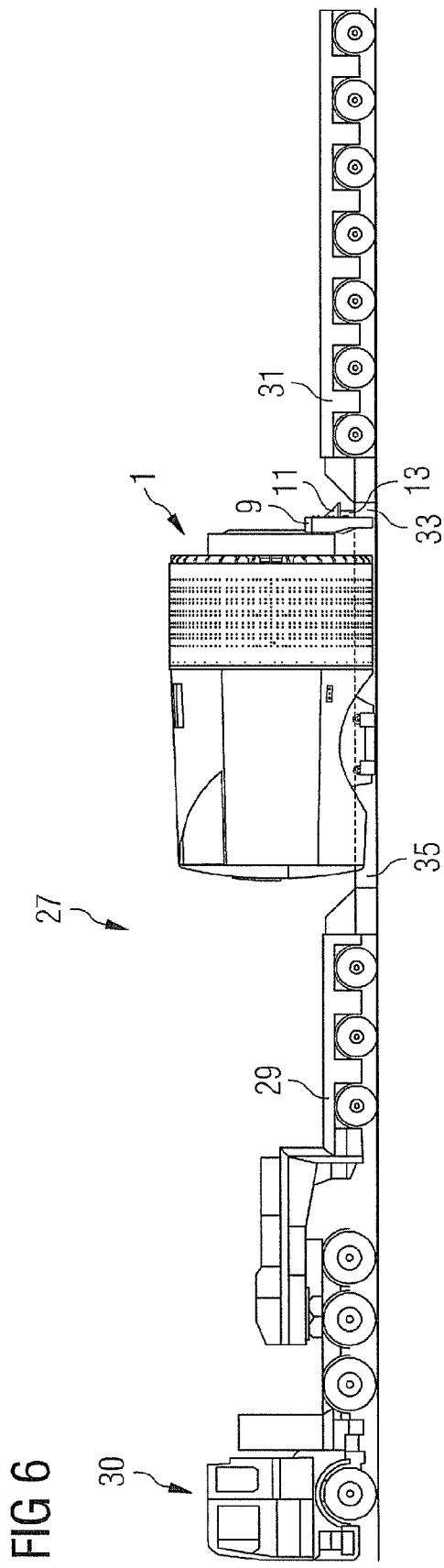
FIG. 6 shows an embodiment of a transport system according to the invention in a side view with the same nacelle as in the previous figures.

FIG. 6 shows an embodiment of a transport system 27 according to the invention. It comprises a first trailer 29 and a second trailer 31 in between which a bridge assembly 33 is suspended. The first trailer 29 is attached to a tractor 30 at the front end of the transport system 27. The second trailer 31 is realised as a dolly, i.e. without any drive unit of its own. On the bridge assembly 33 the nacelle 1 of the preceding figures is loaded. The bridge assembly 33 comprises a first longitudinal beam 35 and a second longitudinal beam (not shown in this perspective), as well as the cross beam 13 as mentioned in the context of FIG. 1.

Figure 7:
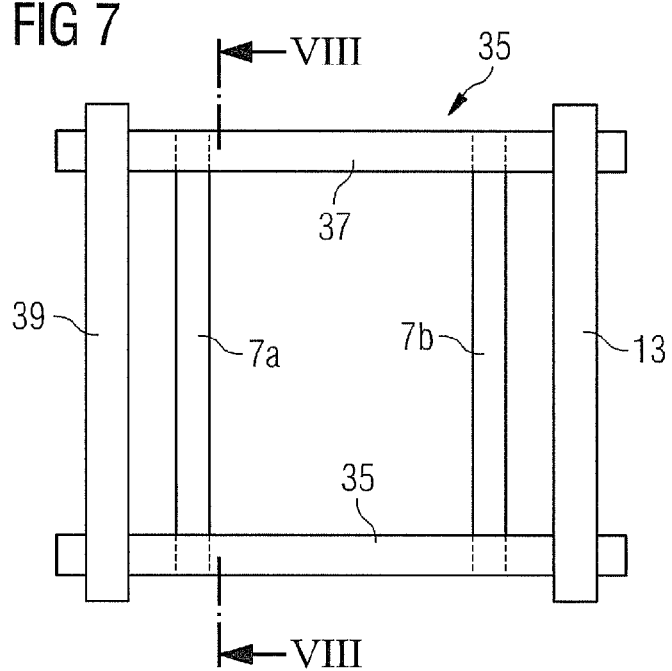
FIG. 7 shows a detailed top view of the bridge assembly shown in FIG. 6.
Figure 8:
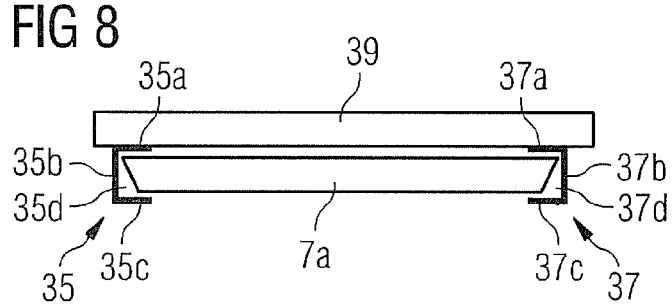
FIG. 8 shows a section view along a line VIII-VIII as shown in FIG. 7.

Full views of the bridge assembly 33 are depicted in FIGS. 7 and 8.

FIG. 7 shows the bridge assembly 33 in a top view. It comprises two parallel longitudinal beams 35, 37. Assembled in parallel upon them in a perpendicular orientation there are cross beams 13, 39. The longitudinal beams 35, 37 and the crossbeams 13, 39 make up components which can be fixed to one another and taken apart later again. In the context of the bridge assembly 33 according to the transport system 27 of FIG. 6, the crossbeams 7a, 7b of the second leg arrangement 7 (cf. FIG. 1) project into the longitudinal beams 35, 37, so that they are fixed in between them.

This can be better seen in FIG. 8, which is a section view along a line VIII-VIII in FIG. 7. Both the longitudinal beam 35 and the longitudinal beam 37 have top regions 35a, 37a and bottom regions 35c, 37c, which are interconnected by middle regions 35b, 37b. As both longitudinal beams 35, 37 are thus realized as profiled beams with the cross-sectional shape of a Π turned over by 90°, orifices 35d, 37d are formed into which the cross beam 7a is inserted at either ends. Its shape at either ends is such that they define a fixing region as mentioned above, i.e. partially elevated from the ground so that the longitudinal beams 35, 37 can be brought underneath the cross beam 7a from the side with little effort.

Figure 9:
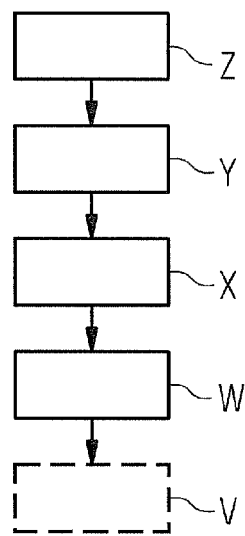
FIG. 9 shows a schematic block diagram of principal steps of an embodiment of a transport method according to the invention.

FIG. 9 shows a schematic block diagram of an embodiment of a transport method according to the invention. For that purpose, a wind turbine nacelle 1 is equipped in the way shown in FIG. 1. For that purpose, in a first step Z the first leg arrangement 9 is attached to the front end B of the nacelle 1 and in a second step Y the second leg arrangement 7 is attached at the bottom part 5 in the opening 3 to build a nacelle 1 according to the invention. Then, in a third step X, the bridge assembly 33 is connected to the first leg arrangement 9 and to the second leg arrangement 7 as shown in FIG. 6. The bridge assembly 33 thus forms a stable frame. In a fourth step W the bridge assembly 33 is connected to the first trailer 29 and to the second trailer 31 as also shown in FIG. 6. Eventually, in an optional fifth step V, the bridge assembly 33 is raised by raising means incorporated in the first trailer 29 and/or in the second trailer 31 (both raising means not shown). The nacelle 1 can now be moved and is held stably by the bridge assembly 33.

Although the present invention has been disclosed in the form of preferred embodiments and variations thereon, it will be understood that numerous additional modifications and variations could be made thereto without departing from the scope of the invention. While a particular shape of leg arrangements and bridge assembly was used as a basis for the description, the transport system and the nacelle according to the invention may be realized in many other ways suitable for the particular size and transport necessities of a specific case.

For the sake of clarity, it is to be understood that the use of "a" or "an" throughout this application does not exclude a plurality, and "comprising" does not exclude other steps or elements.

The invention claimed is:

1. A wind turbine nacelle, comprising:
   a body comprising a longitudinal extension there through, the body further comprising a rear end and a front end at opposed ends of the longitudinal extension and perpendicular thereto;
   an opening defined by the body in a bottom portion of the body;
   a first detachable leg arrangement attached directly to the front end, the first detachable leg arrangement further including a frame part projecting away from the front end;
   a crossbeam positioned underneath the frame part;
   a pair of longitudinal extending beams positioned underneath the crossbeam; and
   a second detachable leg arrangement attached at the bottom portion,
   wherein the longitudinal extending beams serve to carry the crossbeam and the crossbeam supports raising the nacelle.

2. The wind turbine nacelle according to claim 1, wherein the second detachable leg arrangement is partially inserted into the opening.

3. The wind turbine nacelle according to claim 1, wherein the frame part is positioned above ground when the wind turbine nacelle is placed on the ground via at least the first detachable leg arrangement, and
   wherein the frame part is attached such that the frame part is stable enough for a raising force from below sufficient to raise the wind turbine nacelle at the front end at which the first detachable leg arrangement is located.

4. The wind turbine nacelle according to claim 1, wherein the second detachable leg arrangement comprises a fixing region elevated from the ground when the wind turbine nacelle is placed on the ground via at least the second detachable leg arrangement.

5. The wind turbine nacelle according to claim 4 wherein the body at the fixing region includes orifices formed therein for insertion of the second detachable leg arrangement.

6. The wind turbine nacelle according to claim 1, wherein the first detachable leg arrangement is disposed at a first vertical height level perpendicular to the longitudinal extension and the second detachable leg arrangement is disposed at a second vertical height level perpendicular to the longitudinal extension, the second vertical height level distinct from the first vertical height level.

7. A wind turbine nacelle, comprising:
   a body comprising a longitudinal extension there through, the body further comprising a rear end and a front end at opposed ends of and perpendicular to the longitudinal extension;
   an opening defined by the body in a bottom portion of the body;
   a first detachable leg arrangement attached directly to the front end; and
   a second detachable leg arrangement comprising a body including tubular structure, wherein the tubular structure is at least partially inserted into the opening of the nacelle.

8. The wind turbine nacelle according to claim 7, wherein the first detachable leg arrangement is disposed at a first vertical height level perpendicular to the longitudinal extension and the second detachable leg arrangement is disposed at a second vertical height level perpendicular to the longitudinal extension, the second vertical height level distinct from the first vertical height level.

9. The wind turbine nacelle according to claim 7, wherein the first detachable leg arrangement is further removably attached to the front end.

* * * * *